Jan. 5, 1937.   V. W. KLIESRATH   2,066,352
VEHICLE
Filed Jan. 5, 1934   3 Sheets-Sheet 2

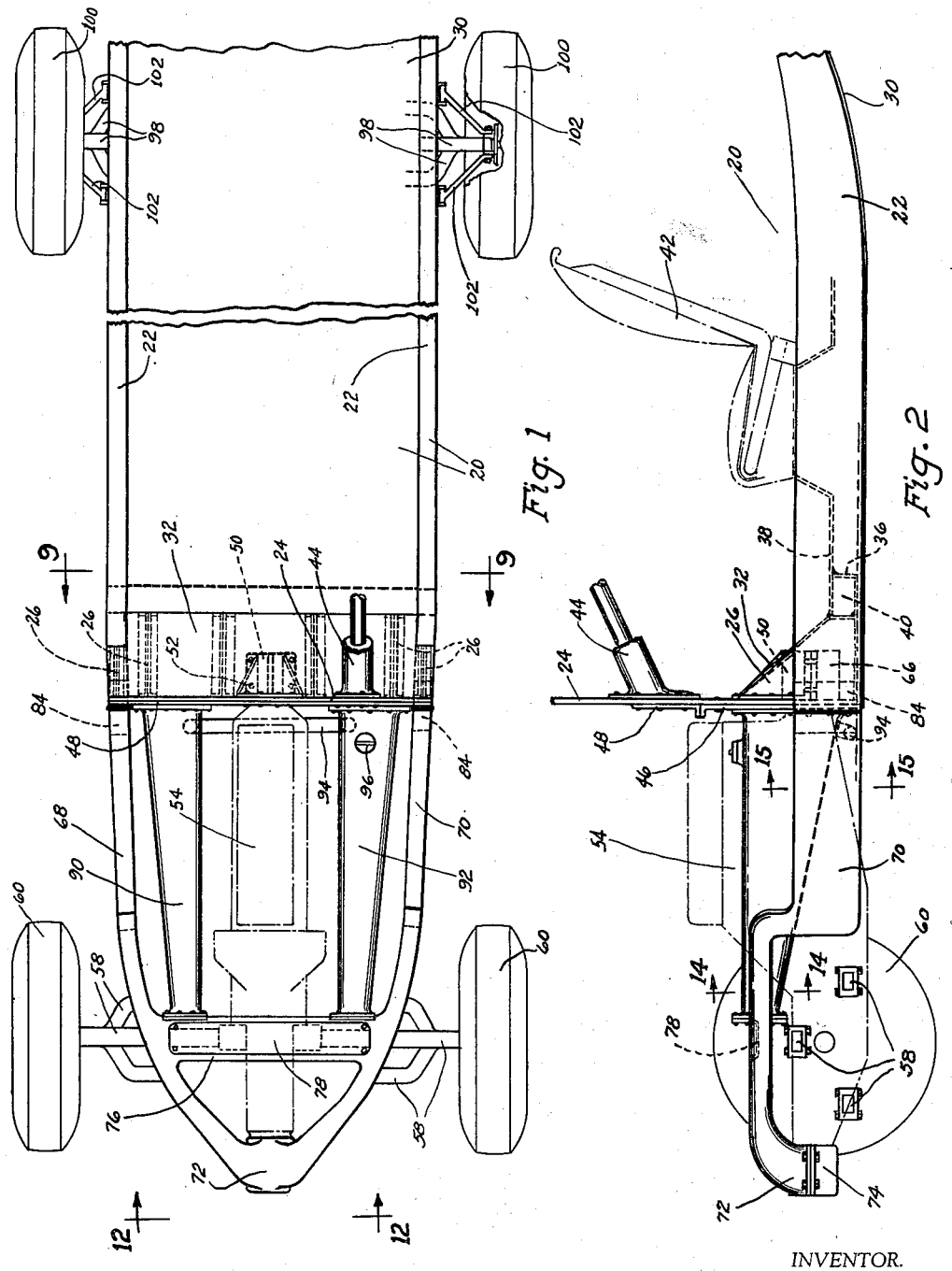

INVENTOR.
Victor W. Kliesrath
BY
ATTORNEY.

Jan. 5, 1937. V. W. KLIESRATH 2,066,352
VEHICLE
Filed Jan. 5, 1934 3 Sheets-Sheet 3

INVENTOR.
Victor W. Kliesrath
BY
ATTORNEY.

Patented Jan. 5, 1937

2,066,352

UNITED STATES PATENT OFFICE 2,066,352

VEHICLE

Victor W. Kliesrath, South Bend, Ind., assignor to The Steel Wheel Corporation, Chicago, Ill., a corporation of New York Application January 5, 1934, Serial No. 705,315

22 Claims. (Cl. 180—64)

This invention relates to vehicles, and is illustrated as embodied in a novel front-wheel-drive automobile having improved means for supporting the engine and preferably having individually-sprung wheels.

An object of the invention is to provide strong and rigid means for supporting the vehicle engine or power plant, and which is preferably adapted to support the power plant pivotally or in some equivalent manner so that the engine reaction torque is transmitted directly to the wheels.

In one desirable arrangement the front engine support is carried by side arms, which preferably have means interfitting with and rigidly securing them to the side chassis members, in such a manner that said arms and said members form substantially continuous rigid side frame members.

I prefer to mount the rear engine support on a transverse dash or the like bridging between said side members at their front ends. One of the objects of the invention is to arrange such a dash, and the toe-board and the floorboard of the car, and suitable reinforcing gussets, as to give a very rigid structure for supporting the rear end of the engine.

Another feature of the invention relates to arranging the front wheels, and a power plant carried thereby, as a unit which can be detached as such without disturbing the other parts of the chassis, as for instance the wheel fenders and the radiator and the headlights and the hood and the like, which may therefore conveniently be mounted on the above-described engine-supporting arms.

For example, the power plant may have front and rear bosses, or other supports, arranged in downwardly-facing half-bearings carried by the supporting arms and by the dash, and held there only by detachable caps which can be removed readily to permit removal of the engine and wheel unit as above described.

Another object of the invention is to reinforce the above-mentioned engine-supporting arms between their ends, for example by structures mounted on the front of the dash and shown as hollow sheet-metal structures adapted to serve as fuel tanks.

I also prefer to provide a radiator support or other reinforcing means connecting the arms between their ends. As a matter of convenient design, the fuel tanks or their equivalents may be secured at their front ends to this radiator support.

Other objects and features of the invention, including a novel rubber engine bearing and an improved radius rod arrangement for the wheel mounting, and other novel combinations of parts and desirable particular constructions, will be apparent from the following description of the illustrative embodiments shown in the accompanying drawings, in which:

Figure 1 is a top plan view of an automobile chassis embodying my invention;

Figure 2 is a longitudinal section just inside the rear wheels, showing the major part of the chassis in side elevation;

Figure 4:
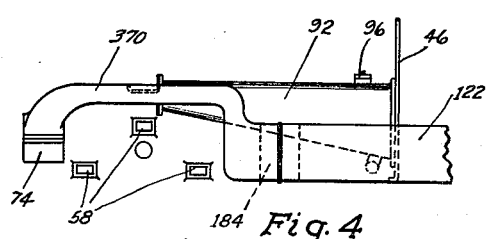
Figure 17:
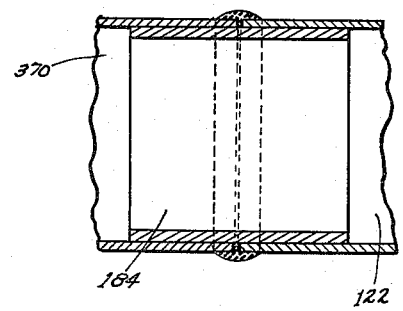
Figure 9:
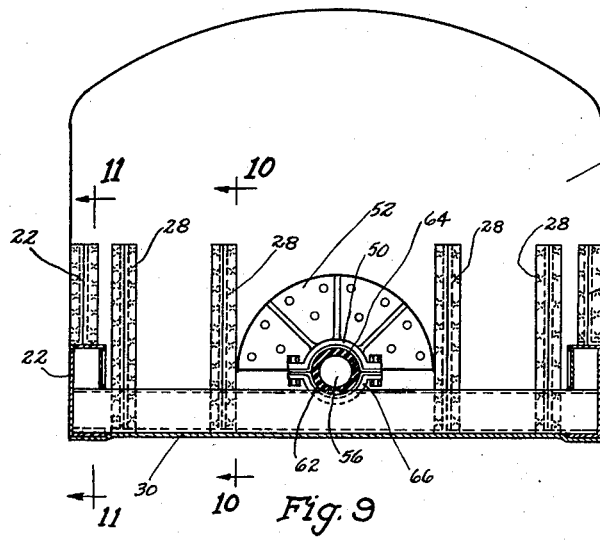
Figure 9 is a section on the line 9—9 of Figure 1, showing the dash in rear elevation and with the foot-board removed.
Figure 10:
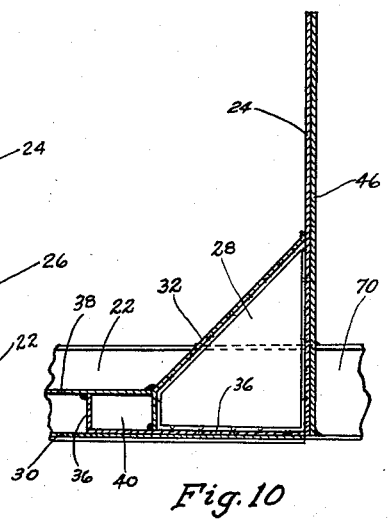
Figure 12:
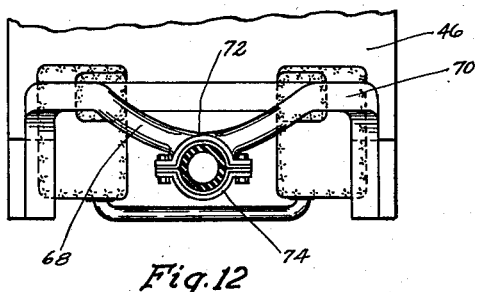
Figure 11:
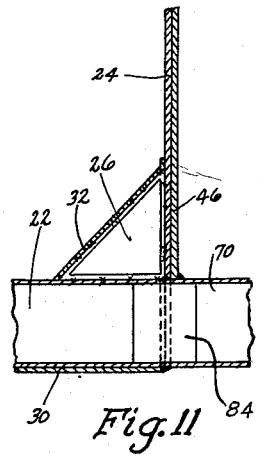
Figure 13:
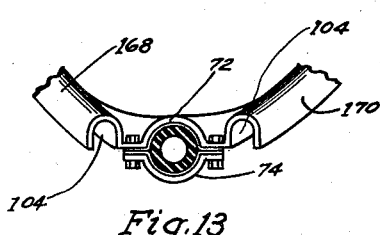
Figure 16:
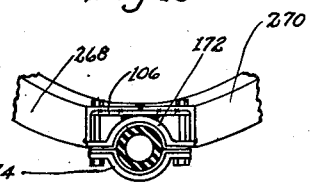
Figures 14, 15:
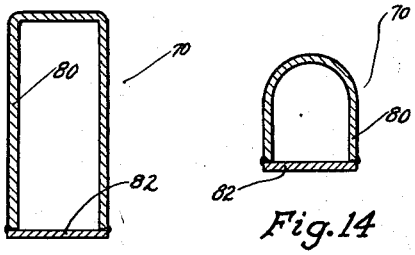

Figures 10 and 11 are sections respectively on the lines 10—10 and 11—11 of Figure 9, showing reinforcing means for the dash;

Figure 12 is a front elevation, looking in the direction of the arrows 12—12 of Figure 1;

Figure 13 is an elevation corresponding to part of Figure 12, but showing a different bearing arrangement;

Figure 14 is a section through one of the side arms, on the line 14—14 of Figure 2;

Figure 15 is a section through one of the side arms, on the line 15—15 of Figure 2;

Figure 16 is an elevation corresponding to Figure 13, but showing a different bearing support; and Figure 17 is a section through the welded joint of Figure 4.

The chassis illustrated in Figures 1 and 2 includes a suitable base 20 for an automobile body, for example of the type fully described in my application No. 651,821, filed January 14, 1933. This base, as explained in that application, preferably embodies the equivalent of a chassis frame, including channel-section longitudinal side members 22 and various cross members and other parts described below. The channels of the side members 22 face toward the center line of the car.

At the front end of the base 20 is arranged a vertical dash extending transversely entirely across the car. As this dash forms one of the important structural elements of the car, as well as a support for the rear engine bearing, it is important that it be very strong. To this end, it may be built up of a vertical steel plate 24, notched at its sides to fit over the side members 22, and braced at its sides by triangular reinforcing gussets 26 spot-welded or otherwise secured to the rear face of plate 24 and to the upper faces of side members 22.

Each gusset 26 is shown made by spot-welding or otherwise securing together two stampings formed with oppositely directed flanges which engage and are secured to the plate 24 and the corresponding side member 22. There are also preferably a plurality (e. g. four as illustrated) of other similar but larger intermediate triangular gussets 28 spot-welded or otherwise secured to the plate 24 and to a bottom plate 30 bridging across and preferably welded to the lower faces of the side members 22.

An inclined toe-board 32, formed as a steel stamping, is (as shown in Figure 10) spot-welded or otherwise secured to the rear face of the plate 24, and to the upper inclined flanges of the gussets 26 and 28, and may if desired be carried down along the rear face of gussets 28 between the side members 22 as shown in Figure 10 and secured as by an arc weld to the upper face of the bottom plate 30.

An auxiliary plate 36 may be provided if desired, however, secured as by spot-welding to the lower edge flanges of the gussets 28 and to the upper surface of the bottom plate 30, and with its rear portion turned vertically and secured as by an arc-weld to the lower face of a foot-well plate 38, the front edge of which may be arc-welded or otherwise secured to the foot-board 32. As best appears in Figure 10, this forms in effect a rectangular cross member 40 connecting the side members 22 at the bottom of the foot-board 32 just behind the gussets 28 bracing the dash plate 24.

As fully explained and claimed, in my application No. 687,056, filed August 28, 1933, the foot-well plate 38 may be carried upwardly to the level of the upper edges of the side members 22, and continued rearwardly supported on said edges, to form an elevated support for the driver's seat 42. The steering column 44 is shown mounted on the plate 24 just ahead of the driver's seat.

The lower portion of the front face of the plate 24 is preferably reinforced by a transverse auxiliary plate 46. If desired, as shown in Figure 2, a further transverse reinforcement 48 may be arranged above the auxiliary plate 46, the two plates being shown with interengaging transverse flanges. The plate 46 may be welded permanently to the plate 24, or bolted thereto, and it is shown as cooperating with the plate 24 to carry the top half 50 of a rear bearing 56 for an engine 54, which bearing is formed with a ribbed supporting flange portion or bracket 52 riveted or otherwise secured to the two plates.

While the engine and its mounting may be arranged generally as described and claimed in my above-mentioned application No. 651,821, as noted above one of the purposes of the present invention is to provide an arrangement whereby the engine, with the axle sections 58 and the front wheels 60 arranged as described in said application No. 651,821 may readily be removed as a unit for repair, etc., without disturbing the rest of the car.

To this end, the rear engine supporting bearing 56 is shown having sleeved thereon and vulcanized or otherwise bonded thereto a rubber bushing 62 which in turn is mounted in and similarly bonded in a metal covering or sleeve 64 the upper half of which is received in the half-bearing 50. A detachable cap 66 may be detachably bolted to the part 50 to complete the supporting bearing, and the sleeve 64 may have (as illustrated) ears at its sides which are received between the half-bearing 50 and the cap 66, to hold the rubber bushing 62 against turning. Thus the engine unit is readily detached from the rear supporting bearing by removing the cap 66.

In order to support the front engine bearing (which is built up similarly to the rear bearing described above) the side members 22 are rigidly and permanently secured to side arms 68 and 70 which carry a front half bearing 72 completed by a detachable bolted cap 74 and enclosing a rubber bushing on the front bearing of the engine in the same manner as described for the rear engine support.

The two arms 68 and 70 may be made in one piece, or they may be made separately and welded permanently to the front half bearing 72. They are connected by a bridge or transverse radiator support 76, formed integrally therewith or welded or otherwise secured thereto, and which is formed with a trough 78 receiving the usual radiator core (not shown).

As shown in Figures 14 and 15, the above-described supporting structure may be made very strong and rigid, by forming it as a channel-section steel stamping 80, the open side of which has a steel plate 82 permanently welded thereto to give a box-shaped section. The rear ends of the box-section arm so formed is shown fitting over a connecting sleeve 84, which extends into the open end of the corresponding side member 22. By permanently securing the sleeve 84 to the two members 70 and 22 (for example by arc-welding as illustrated) these members become in effect one single rigid part, the joint between them actually being stronger than the other portions thereof.

The above structure gives a very strong and rigid support for the front engine mounting, in effect integral with the frame members 22. In order to strengthen it still further, however, I prefer to provide tubular reinforcing members such as two elongated gasoline tanks 90 and 92, the ends of which are welded or otherwise secured in a liquid-tight manner to the radiator support 76 and the plate 46 which forms part of the vertical dash. These tanks are shown connected by a conduit 94 or the like, and are provided with a filler opening closed by a detachable filler cap 96.

As the gasoline tanks 90 and 92 are of considerable height, and are of tubular construction, they form reinforcing members of great strength. They also form, in effect, supports analogous in a broad sense to the piers of a cantilever bridge, the arms 68 and 70 overhanging them and transmitting to them through the radiator support 76 a considerable part of the weight, which is transmitted through the two tanks to the dash.

This permits making the rear part of the arms 68 and 70 lighter than would otherwise be the case, since only part of the weight comes directly on them as a downward bending stress, while the reaction of the weight transmitted through the two tanks comes on the rear part of the arms as an upward force. Since the tops of the tanks are placed in compression by the weight, and the bottoms tend to be in tension, they may also be regarded in themselves as having a cantilever action, to resist which the great height of the tanks is very advantageous.

It will be seen that the weight of the front end of the car is transmitted by the above-described structure and the two engine bearings to the engine or power plant assembly 54, whence it is transmitted yieldingly as described in application No. 651,821 through the axle sections 58 to the front wheels 60. The axle sections 58 also transmit the engine reaction torque yieldingly directly to the front wheel 60.

The weight of the rear end is transmitted as described in said application No. 651,821 through rear axle sections 98 to the rear wheels 100. If desired, pairs of radius rods 102 may be pivoted to the side members 22 and to the supports on which the rear wheel are journaled, to restrict any tendency to side sway or other undesirable motions.

Figure 2 shows how the arms 68 and 70 are offset upwardly over the axle sections 58 so that they will not interfere with their movements.

As shown in Figure 13, the arms 168 and 170 (corresponding to arms 68 and 70) may be additionally strengthened by forming downwardly-facing channels 104 therein. Or, as appears in Figure 16, corresponding arms 268 and 270 may be formed as separate channel-section stampings connected by a plate 106 welded to both of them, and with the joint between the arms arc-welded. In this case the half-bearing 172 is a separately-formed plate welded across the lower face of the arms, and having the center of the bearing welded to the plate 106.

Figure 3:
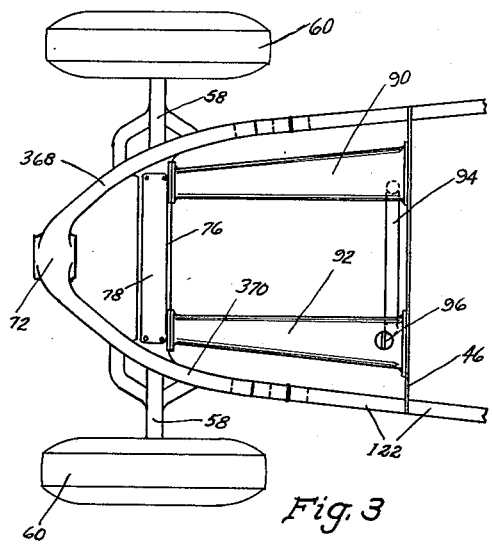
Figures 3 and 4 are views corresponding respectively to the front portions of Figures 1 and 2, but showing a modification.

In the arrangement of Figures 3 and 4, side members 122 project some distance forwardly of the dash, and are secured just behind the axle sections 58 to engine-supporting arms 368 and 370. The joint is shown as comprising a sleeve 184 fitting within and welded to the adjacent ends of the arms and of the side members 122 (Figure 17).

Figure 5:
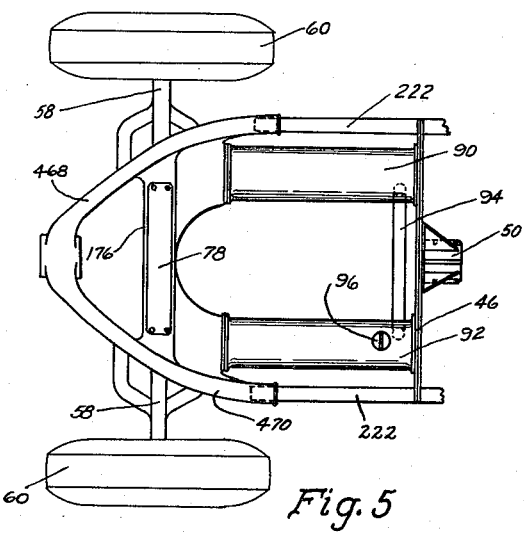
Figures 5 and 6 are views corresponding respectively to Figures 3 and 4, but showing another modification.
Figure 6:
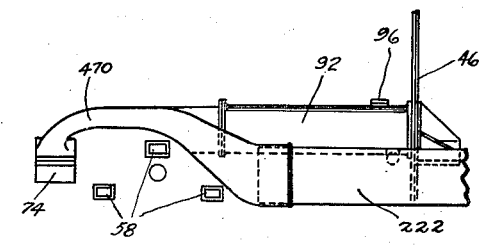

Figures 5 and 6 show the front ends of side members 222 fitting within and welded to the rear ends of supporting arms 468 and 470. In this case also the transverse radiator support 176 is made quite wide, to increase its rigidity.

Figure 7:
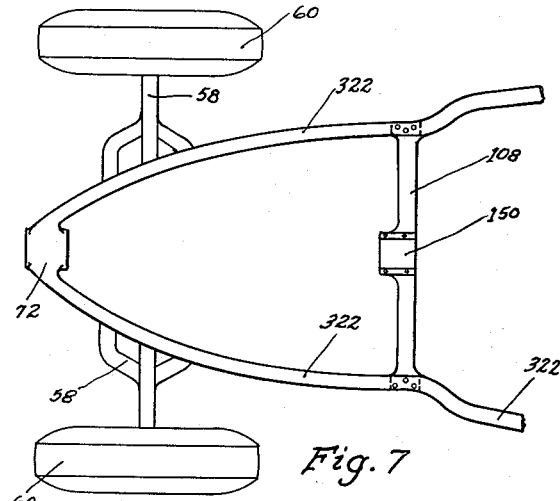
Figures 7 and 8 are views corresponding respectively to Figures 3 and 4, but showing still another modification.
Figure 8:
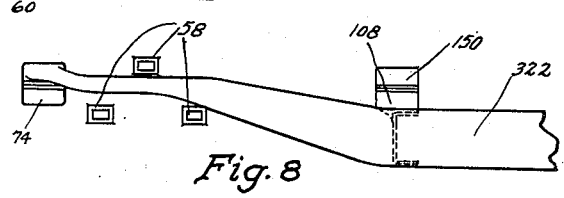

In Figures 7 and 8 the invention is shown embodied in an ordinary type chassis frame having side members 322 brought together at the front of the car to support the bearing 72, to which they may be welded. A transverse support 108 serves both as a support for the rear engine half-bearing 150 and for a separate dash (not shown).

It will be noted that the radiator and radiator grille (if one is provided), the hood, the front wheel fenders, the head-lamps, and the like may all be mounted on the arms 68 and 70, and need not be disturbed when the engine and front wheel unit is removed for repair work. The arms 68 and 70 are merely propped up, caps 66 and 74 removed, and the engine unit run out from under the car. Similarly the unit is replaced afterwards without disturbing the other parts.

While several illustrative constructions have been described in detail, it is not my intention to limit the scope of the invention to those particular constructions, or otherwise than by the terms of the appended claims.

I claim:

1. A vehicle having a chassis structure and a power plant pivotally mounted thereon, said structure including a transverse element carrying a bearing for the rear end of the engine, side arms projecting forwardly on opposite sides of the engine and carrying a bearing for the front end of the engine alined with said rear bearing, and devices disposed on opposite sides of the engine and mounted at their rear ends on the transverse element in a plane displaced vertically from the plane of said side arms and at their front ends supporting said arms between their ends.

2. A vehicle having a chassis structure and a power plant mounted thereon, said structure including a transverse element supporting the rear end of the engine, side arms projecting forwardly on opposite sides of the engine and supporting the front end of the engine, and devices disposed on opposite sides of the engine and mounted at their rear ends on the transverse element in a plane displaced vertically from the plane of said side arms and at their front ends supporting said arms between their ends.

3. A vehicle having a chassis structure and a power plant pivotally mounted thereon, said structure including a transverse element carrying a bearing for the rear end of the engine, side arms projecting forwardly on opposite sides of the engine and carrying a bearing for the front end of the engine alined with said rear bearing, and hollow tubular structures adapted to serve as fuel tanks and disposed on opposite sides of the engine and mounted at their rear ends on the transverse element in a plane displaced vertically from the plane of said side arms and at their front ends supporting said arms between their ends.

4. A vehicle having a chassis structure and a power plant mounted thereon, said structure including a transverse element supporting the rear end of the engine, side arms projecting forwardly on opposite sides of the engine and supporting the front end of the engine, and hollow tubular structures adapted to serve as fuel tanks and disposed on opposite sides of the engine and mounted at their rear ends on the transverse element in a plane displaced vertically from the plane of said side arms and at their front ends supporting said arms between their ends.

5. A vehicle having a chassis structure including spaced arms adapted to receive a power plant between them and having at their front ends means for supporting the front end of said power plant, in combination with supports mounted on said chassis and supporting said arms between their ends.

6. A vehicle having a chassis structure including spaced arms adapted to receive a power plant between them and having at their front ends means for supporting the front end of said power plant, in combination with hollow tubular structures mounted on said chassis and adapted to serve as fuel tanks and forming supports for said arms between their ends.

7. A vehicle having a chassis structure including spaced arms adapted to receive a power plant between them and having at their front ends means for supporting the front end of said power plant, a transverse element connecting said arms between their ends and adapted to support a radiator for the cooling system of said power plant, and supports connected at their rear ends to said chassis and extending generally parallel to said arms and connected at their front ends to said transverse element and through said element supporting said arms between their ends.

8. A vehicle having a chassis structure including spaced arms adapted to receive a power plant between them and having at their front ends means for supporting the front end of said power plant, a transverse element connecting said arms between their ends and adapted to support a radiator for the cooling system of said power plant, and hollow tubular structures connected at their rear ends to said chassis and adapted to serve as fuel tanks and forming supports extending generally parallel to said arms and connected at their front ends to said transverse element and through said element supporting said arms between their ends.

9. A vehicle having a chassis structure including spaced arms adapted to receive a power plant between them and having at their front ends means for supporting the front end of said power plant, a transverse element connecting said arms between their ends, and supports connected at their rear ends to said chassis and extending generally parallel to said arms and connected at their front ends to said transverse element and through said element supporting said arms between their ends.

10. A vehicle having a chassis structure including spaced arms adapted to receive a power plant between them and having at their front ends means for supporting the front end of said power plant, a transverse element connecting said arms between their ends, and hollow tubular structures connected at their rear ends to said chassis and adapted to serve as fuel tanks and forming supports extending generally parallel to said arms and connected at their front ends to said transverse element and through said element supporting said arms between their ends.

11. A vehicle having side members extending substantially continuously and rigidly throughout the length of the vehicle and converging at the front end of the vehicle and carrying a front bearing at the center line of the vehicle, means bridging across said members and carrying a rear bearing alined with the front bearing, and a power plant pivotally mounted in said bearings.

12. A vehicle having side members extending substantially continuously and rigidly throughout the length of the vehicle and converging at the front end of the vehicle and carrying a front bearing at the center line of the vehicle, means bridging across said members and carrying a rear bearing alined with the front bearing, a power plant pivotally mounted in said bearings, transverse reinforcing means bridging between the side members a short distance back of said front bearing and adapted to support a radiator, and supports connecting intermediate parts of the side members to said bridging means.

13. A vehicle having side members extending substantially continuously and rigidly throughout the length of the vehicle and converging at the front end of the vehicle and carrying a front bearing at the center line of the vehicle, means bridging across said members and carrying a rear bearing alined with the front bearing, a power plant pivotally mounted in said bearings, and supports connecting intermediate parts of the side members to said bridging means.

14. A vehicle having side members extending substantially continuously and rigidly throughout the length of the vehicle and converging at the front end of the vehicle and carrying a front bearing at the center line of the vehicle, means bridging across said members and carrying a rear bearing alined with the front bearing, a power plant pivotally mounted in said bearings, and tubular tank structures forming supports connecting intermediate parts of the side members to said bridging means.

15. A vehicle having side frame members, a dash mounted on said members at their front ends and having a rear engine support centrally carried thereby, arms having their rear ends provided with means interfitting with and secured to the front ends of the side members, and a front engine support alined with the rear support and carried by the front ends of said arms.

16. A vehicle having side frame members, a dash mounted on said members at their front ends and having a rear engine support centrally carried thereby, arms having their rear ends provided with means interfitting with and secured to the front ends of the side members, tubular tank structures mounted on the front of said dash and supporting the arms respectively between their ends, and a front engine support alined with the rear support and carried by the front ends of said arms.

17. A vehicle having side frame members, a dash mounted on said members at their front ends and having a rear engine support centrally carried thereby, arms having their rear ends provided with means interfitting with and secured to the front ends of the side members, supporting structures mounted on the front of said dash and supporting the arms respectively between their ends, and a front engine support alined with the rear support and carried by the front ends of said arms.

18. A vehicle having side frame members, a dash mounted on said members at their front ends and having a rear engine support centrally carried thereby, arms having their rear ends provided with means interfitting with and secured to the front ends of the side members, supporting structures mounted on the front of said dash and supporting the arms respectively between their ends, a radiator support connecting and reinforcing said arms between their ends, and a front engine support alined with the rear support and carried by the front ends of said arms.

19. A vehicle having side frame members, a dash mounted on said members at their front ends and having a rear engine support centrally carried thereby, arms having their rear ends provided with means interfitting with and secured to the front ends of the side members, tubular tank structures mounted on the front of said dash and supporting the arms respectively between their ends, a radiator support to which the front ends of said structures are secured, thereby connecting and reinforcing said arms between their ends, and a front engine support alined with the rear support and carried by the front ends of said arms.

20. Engine supporting means comprising a pair of angle-section arms converging to bring their ends together, a plate bridging the joint between and arranged in the angles of said arms and securing said arms together, and a bearing member centrally secured to said plate and having side flanges secured to the side flanges of said arms.

21. Engine supporting means comprising a pair of angle-section arms converging to bring their ends together, a plate bridging the joint between and arranged in the angles of said arms and securing said arms together, a half bearing centrally secured to said plate and having side flanges secured to the side flanges of said arms, and a cooperating half bearing having side flanges provided with attaching bolts passing through the side flanges of the first half bearing and through said arms.

22. A vehicle having downwardly-facing front and rear half-bearings arranged approximately in the center line of the vehicle, a unit comprising front wheels having a power-plant mounted thereon and having parts arranged in said half-bearings, and detachable bottom caps forming cooperating half-bearings and securing said parts in said top half-bearings, in such a manner that by detaching said caps the power plant may be dropped down and said unit removed without disturbing other parts of the vehicle.

VICTOR W. KLIESRATH.